United States Patent [19]

Yamaya et al.

[11] Patent Number: 4,987,207
[45] Date of Patent: Jan. 22, 1991

[54] THERMOSETTING RESIN COMPOSITIONS

[75] Inventors: Norimasa Yamaya; Masahiro Ohta; Akihiro Yamaguchi, all of Kanagawa, Japan

[73] Assignee: Mitsui Toatsu Chemicals, Inc., Tokyo, Japan

[21] Appl. No.: 351,470

[22] Filed: May 15, 1989

[30] Foreign Application Priority Data

May 17, 1988 [JP] Japan .............................. 63-118362
Aug. 18, 1988 [JP] Japan .............................. 63-203717

[51] Int. Cl.$^5$ ..................... C08G 73/00; C08F 283/04
[52] U.S. Cl. .................................. 528/170; 525/422; 525/426
[58] Field of Search ................. 525/422, 426; 528/170

[56] References Cited

U.S. PATENT DOCUMENTS

| | | | |
|---|---|---|---|
| 4,255,313 | 3/1981 | Antonoplos et al. | 525/426 |
| 4,362,826 | 12/1982 | Yonezawa et al. | 525/426 |
| 4,621,122 | 11/1986 | Guilbert et al. | 525/422 |

FOREIGN PATENT DOCUMENTS 107897  5/1984  European Pat. Off. .

OTHER PUBLICATIONS

Patent Abstracts of Japan, vol. 12, No. 275 (C-516) [3122], Jul. 29, 1988 & JP-A-63191810.
Patent Abstracts of Japan, vol. 12, No. 472 (C-551) [3319], Dec. 9, 1988, p. 75, C 516 & JP-A-6354435.

*Primary Examiner*—John Kight, III
*Assistant Examiner*—Kathryne Shelborne
*Attorney, Agent, or Firm*—Burns, Doane, Swecker & Mathis

[57]  ABSTRACT

The present invention relates to a thermosetting resin composition comprising about 100 parts by weight of a polyimide and from 5 to about 100 parts by weight of a bismaleimide having a similar structure and processes for preparing the same.

11 Claims, No Drawings

THERMOSETTING RESIN COMPOSITIONS

BACKGROUND OF THE INVENTION (a) Field of the Invention

This invention relates to thermosetting resin compositions that exhibit excellent heat resistance properties and are useful as adhesive films, laminating materials, and molding materials, and processes for preparing the same.

(b) Description of the Prior Art

Polyimide resins have conventionally been used widely in the industry due to their excellent heat resistance, electrical insulating properties and chemical resistance properties.

Among polyimide resins, condensation polyimide resins, which are prepared via polyamic acids by reacting a tetracarboxylic dianhydride and a diamine in a polyimide resin, are among the many resins that exhibit excellent properties. They are however accompanied by disadvantages such as high softening points and poor processabilities. Although a thermoplastic polyether imide that has improved processability at the sacrifice of some heat resistance ("Ultem", trade mark; product of General Electric Company) has been known, its heat resistance and chemical resistance are less than satisfactory.

On the other hand, addition-type polyimide resins prepared by polymerizing bismaleimide compounds exhibit excellent thermal properties but are inferior in mechanical strength. It is therefore impossible to form them into films by casting.

SUMMARY OF THE INVENTION

The present invention overcomes the problems and disadvantages of the prior art by providing thermosetting resin compositions that exhibit superior properties.

It is an object of this invention to provide thermosetting resin compositions that can be formed into films or the like prior to thermal curing and exhibit excellent toughness, flexibility, adhesion and heat resistance after thermal curing.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the invention provides a thermosetting resin composition comprising:

i) about 100 parts by weight of a polymer having recurring units represented by the formula (I):

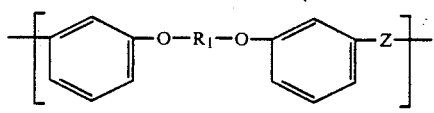

wherein $R_1$ represents a divalent group selected from the group consisting of

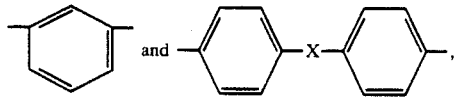

X is
selected from the group consisting of a direct bond, divalent hydrocarbon groups having from about 1 to about 10 carbon atoms, a hexafluorinated isopropylidene group, a carbonyl group, a thio group, a sulfinyl group, a sulfonyl group and an oxo group, and Z represents at least one of

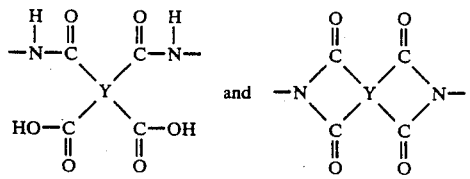

wherein Y represents a tetravalent group selected from the group consisting of aliphatic groups having at least two carbon atoms, cycloaliphatic groups, monocyclic aromatic groups, fused polycyclic aromatic groups, and non-fused cyclic aromatic groups composed of aromatic groups bonded together directly or via a cross-link; and (ii) from about 5 to about 100 parts by weight of a bismaleimide compound selected from the group consisting of compounds of the formula (II):

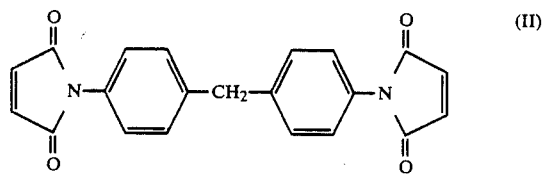

and compounds of the formula (III):

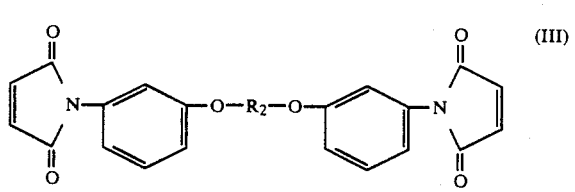

wherein $R_2$ represents a divalent group selected from the group consisting of

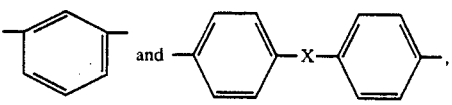

X is
selected from the group consisting of a direct bond, divalent hydrocarbon groups having from about 1 to about 10 carbon atoms, hexafluorinated isopropylidene groups, carbonyl groups, thio groups, sulfinyl groups, sulfonyl groups and oxo groups.

DETAILED DESCRIPTION OF THE INVENTION

Reference will now be made in detail to the present preferred embodiments of the invention.

Preferably, the thermosetting resin composition of the invention contains as a polymer a polyamic acid obtained by reacting (a) a diamine compound represented by the formula (IV):

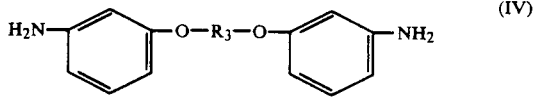

wherein R₃ represents a divalent group selected from the group consisting of

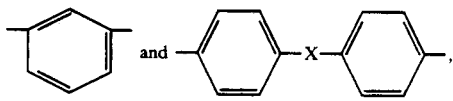

X is selected from the group consisting of direct bond, divalent hydrocarbon groups having from about 1 to about 10 carbon atoms, a hexafluorinated isopropylidene group, a carbonyl group, a thio group, a sulfinyl group, a sulfonyl group and an oxo group, with (b) at least one tetracarboxylic dianhydride by a method known per se in the art; or (c) a polyimide obtained by dehydrating and cyclizing the polyamic acid.

Exemplary suitable diamine compounds include 1,3-bis(3-aminophenoxy)benzene, bis[4-(3-aminophenoxy)phenyl]methane, 1,1-bis[4-(3-aminophenoxy)phenyl]ethane, 1,2-bis[4-(3-aminophenoxy)phenyl]ethane, 2,2-bis[4-(3-aminophenoxy)phenyl]propane, 2,2-bis[4-(3-aminophenoxy)phenyl]butane, 2,2-bis[4-(3-aminophenoxy)phenyl]-1,1,1,3,3,3-hexafluoropropane, 4,4'-bis(3aminophenoxy)biphenyl, bis[4-(3-aminophenoxy)phenyl]ketone, bis[4-(3-aminophenoxy)phenyl]sulfide, bis[4-(3-aminophenoxy)phenyl]sulfoxide, bis[4-(3-aminophenoxy)phenyl]sulfone, bis[4-(3-aminophenoxy)phenyl]ether, etc. The diamine compounds may be used either singly or in combination.

A tetracarboxylic dianhydride is represented by the formula (V):

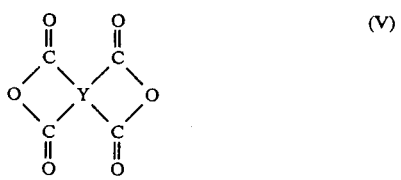

wherein Y is a tetravalent group selected from the group consisting of aliphatic groups having at least two carbon atoms, cycloaliphatic groups, monocyclic aromatic groups, fused polycyclic aromatic groups, and non-fused cyclic aromatic groups composed of aromatic groups bonded together directly or via a cross-link. Y represents a tetravalent group selected from the group consisting of aliphatic hydrocarbons having from 1 to 4 carbon atoms, cycloaliphatic hydrocarbons having from 4 to 8 carbon atoms,

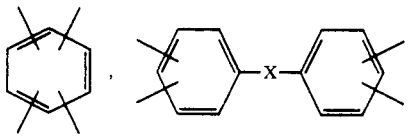

wherein X is selected from the group consisting of a direct bond, aliphatic hydrocarbons having from 1 to 4 carbon atoms, aliphatic hydrocarbons having from 1 to 4 carbon atoms substituted by from 1 to 6 fluorine atoms, —O—, —CO—,

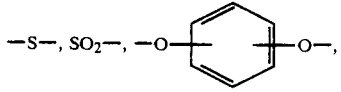

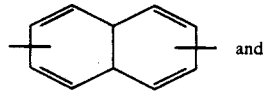 and

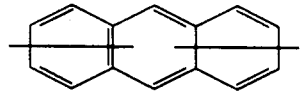

Exemplary suitable tetracarboxylic dianhydrides include ethylenetetracarboxylic dianhydride, butanetetracarboxylic dianhydride, cyclopentanetetracarboxylic dianhydride, pyromellitic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 2,2',3,3'-biphenyltetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(3,4-carboxyphenyl)sulfone dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)diphthalic dianhydride, 4,4'-(m-phenylenedioxy)diphthalic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, and 1,2,7,8-phenanthrenetetracarboxylic dianhydride. These tetracarboxylic dianhydrides may be used either singly or in combination.

N,N'-4,4'-Diphenylmethanebismaleimide represented by the formula (II) can be easily prepared by causing 4,4'-diaminodiphenylmethane and maleic anhydride to undergo a condensation and dehydration reaction in a manner known per se in the art.

Other bismaleimide compounds (III) useful in the practice of this invention include 1,3-bis(3-maleimidophenoxy)benzene, bis[4-(3-maleimidophenoxy)phenyl]methane, 1,1-bis[4-(3-maleimidophenoxy)phenyl]ethane, 1,2-bis[4-(3-maleimidophenoxy)phenyl]ethane, 2,2-bis[4-(3-maleimidophenoxy)phenyl]propane, 2,2-bis[4-(3-maleimidophenoxy)phenyl]butane, 2,2-bis[4-(3-maleimidophenoxy)phenyl]-1,1,1,3,3,3-hexafluoropropane, 4,4'-bis(3-maleimidophenoxy)biphenyl, bis[4-(3-maleimidophenoxy)- phenyl]ketone, bis[4-(3-maleimidophenoxy)phenyl]sulfide, bis[4-(3-maleimidophenoxy)phenyl]sulfoxide, bis[4-(3-maleimidophenoxy)phenyl]sulfone, bis[4-(3-maleimidophenoxy)phenyl]ether, etc. These compounds may be used either singly or in combination.

The bismaleimide compounds can be prepared easily by causing their corresponding diamine compounds and maleic anhydrides to undergo a condensation and dehydration reaction.

With respect to the mixing ratio of the polymer of the formula (I) to the bismaleimide compound, the bismaleimide compound may be used in an amount of from about 5 to about 100 parts by weight, preferably from about 10 to about 80 parts by weight per 100 parts by weight of the polymer of the formula (I). If the proportion of the bismaleimide compound is smaller than about 5 parts by weight, the bismaleimide compound cannot exhibit the effects of improving processability and mechanical properties, which are intended to be achieved in the present invention. On the other hand, amounts greater than about 100 parts by weight of the bismaleimide compound result in resin compositions which are brittle and have no formability and moldability.

Although the mixing of the polymer (I) and bismaleimide compound may be conducted in the form of powders, it is generally conducted by adding and dissolving the bismaleimide compound in a polymer varnish compound, preferably, in a polyamic acid and/or a polyimide varnish or suspension.

Exemplary solvents suitable for use in preparing the polymer varnish or suspension include N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethane, bis(2-methoxyethyl) ether, 1,2-bis(2-methoxyethoxy)ethane, bis(2-{2-methoxyethoxy)ethyl}ether, 1,3-dioxane, 1,4-dioxane, pyridine, picoline, dimethyl sulfoxide, dimethyl sulfone, tetramethylurea and hexamethyl phosphoyl amide. These organic solvents may be used either singly or in combination.

The resin composition of the invention can be used as prepregs by having base materials such as glass cloths, carbon cloths or the like impregnated therewith, followed by drying. As an alternative, the resin composition can be cast and dried on a glass plate, stainless steel plate or the like so that it can be used as a film-like adhesive free of any base material for various applications. In this case, the drying temperature and time vary depending on the solvent employed and the kind of the bismaleimide used. However, it is necessary to maintain the temperature lower than the temperature at which marked polymerization of the bismaleimide compound begins to take place. The drying time must be long enough to reduce the content of the solvent to at least a level no affecting adversely the objects of this invention.

The resin composition can also be used as is, namely, in the form of powder as a molding material. Although the curing time varies depending on the type of bismaleimide, tough and heat-resistant, molded articles can be obtained by heating and curing molded green products generally under an elevated pressure of from about normal pressure to about 1,000 kg/cm$^2$ at from about 150° to about 450° C. for from about 0.1 to about 10 hours.

The thermosetting resin composition of this invention may contain a polymerization catalyst if needed. Although no particular limitation is imposed on the amount of the catalyst to be used, preferably the catalyst is employed in an amount of from about 0.001 to about 10 wt. %, more preferably from about 0.1 to about 5 wt. % based on the total weight of the materials to be polymerized. Conventional free radical catalysts such as benzoyl peroxide, t-butyl hydroperoxide, dicumyl peroxide, azobisisobutyronitrile and azobiscyclohexane carbonitrile are suitable for use as a polymerization catalyst. Two or more catalysts may be used in combination as needed.

The thermosetting resin compositions of this invention are excellent in adhesion, formability, moldability, flexibility and heat resistance. The thermosetting resin compositions have numerous applications including as adhesives, laminates and molding materials in electrical and electronic equipment and apparatus, and thus have significant industrial utility and advantages.

The invention will be further clarified by the following examples, which are intended to be purely exemplary of the invention.

EXAMPLE 1-4

A vessel fitted with a stirrer, a reflux condenser and a nitrogen gas inlet tube was charged with 73.6 g (0.2 mole) of 4,4'-bis(3-aminophenoxy)biphenyl and 467.2 g of N,N-dimethylacetamide. At room temperature, 43.2 g (0.198 mole) of pyromellitic acid dianhydride were added in portions under a nitrogen gas atmosphere while paying attention to any increase of the temperature of the solution. The resultant solution was stirred at room temperature for about 20 hours to obtain a polyamic acid varnish in N,N-dimethylacetamide as a solvent. The varnish had a solution viscosity of 64 poises at 25° C. and a resin content of 20%. The inherent viscosity of the polyamic acid thus obtained was 0.82 dl/g at 35° C. and had a 0.5% resin content.

To 100 g portions of the polyamic acid varnish, N,N'-4,4'-diphenylmethanebismaleimide was added respectively in amounts given in Table 1, followed by the addition of N,N-dimethylacetamide to give a resin content of 20.0%. The components thus added were dissolved at room temperature. Each of the resin compositions thus prepared was cast on a glass plate and then dried at 130° C. for 1 hour and then at 180° C. for 2 hours, both, under a nitrogen gas atmosphere, thereby obtaining an uncured film 25 μm thick as a soft, brown and transparent film. By heating the uncured film at 250° C. for 30 minutes, a cured tough film was obtained. Table 1 shows the softening points of those uncured films (as measured by the TMA penetration method) and their tensile shear strengths at 25° C. and a high temperature of 240° C. as measured in accordance with JIS-K-6848 and JIS-K-6850, namely, after separately inserting them between preheated steel sheets (cold rolled steel, JIS-3141, SPEC/SD, 25×100×1.6 mm) and bonding them to the associated steel sheets at 250° C. under 20 kg/cm$^2$ for 30 minutes. Examples 5-8 and Comparative Examples 1-2:

In a similar manner as in Examples 1-4, polyamic acid varnishes were obtained using the diamine compounds and tetracarboxylic dianhydrides shown in Table 1 in their corresponding amounts described in terms of moles in Table 1. In the polyamic varnishes, the bismaleimide compound was then dissolved in the amounts shown in Table 1 to obtain resin composition varnishes.

Thereafter, the procedure of Examples 1–4 was followed to obtain the results summarized in Table 1.

EXAMPLES 9–12

A vessel fitted with a stirrer, a reflux condenser and a nitrogen gas inlet tube was charged with 73.6 g (0.2 mole) of 4,4'-bis(3-aminophenoxy)biphenyl and 467.2 g of N,N-dimethylacetamide. At room temperature, 43.2 g (0.198 mole) of pyromellitic acid dianhydride were added in portions under a nitrogen gas atmosphere while paying attention to any increase of the temperature of the solution. The resultant solution was stirred at room temperature for about 20 hours to obtain a polyamic acid varnish in N,N-dimethylacetamide as a solvent. The varnish had a solution viscosity of 64 poises at 25° C. and a resin content of 20.0%. The inherent viscosity of the polyamic acid thus obtained was 0.82 dl/g at 35° C. and had a 0.5% resin content.

To 100 g portions of the polyamic acid varnish, 4,4'-bis(3-maleimidophenoxy)biphenyl was added respectively in amounts given in Table 1, followed by the addition of N,N-dimethylacetamide to give a resin content of 20.0%. The components thus added were dissolved at room temperature. Each of the resin compositions thus prepared was cast on a glass plate and then dried at 150° C. for 1 hour and then at 200° C. for 2 hours, both, under a nitrogen gas atmosphere, thereby obtaining an uncured film of 25 μm thick as a soft, brown and transparent film. By heating the uncured film at 250° C. for 30 minutes, a cured tough film was obtained. Table 1 shows the softening points of those uncured films (as measured by the TMA penetration method) and their tensile shear strengths at 25° C. and a high temperature of 240° C. as measured in accordance with JIS-K-6848 and JIS-K-6850, namely, after separately inserting them between preheated steel sheets (cold rolled steel, JIS-3141, SPEC/SD, 25×100×1.6 mm) and bonding them to the associated steel sheets at 250° C. under 20 kg/cm² for 30 minutes.

EXAMPLE 13

Using 41.0 g (0.10 mole) of 2,2-bis[4-(3-aminophenoxy)phenyl]propane as a diamine compound and 30.6 g (0.095 mole) of 3,3',4,4'-benzophenonetetracarboxylic dianhydride as a tetracarboxylic dianhydride, the procedure of Examples 9–12 was repeated in much the same way to obtain a polyamic acid varnish. The varnish was reacted further at 150°–160° C. for 16 hours to subject it to dehydration and condensation, thereby obtaining a polyimide varnish having a resin content of 19.2% and a solution viscosity of 74 poises at 25° C.

To 100 g of the polyimide varnish, 9.6 g of 2,2-bis[4-(3-maleimidophenoxy)phenyl]propane and 20.0 g of N,N-dimethylacetamide were added, followed by dissolution at room temperature. Thereafter, the procedure of Examples 9–12 was repeated in much the same way to obtain the results shown in Table 1.

EXAMPLE 13–16

In a similar manner as in Examples 9–12, polyamic acid varnishes were obtained using the diamine compounds and tetracarboxylic dianhydrides, which are shown in Table 1, in their corresponding amounts described in terms of moles in Table 1. In the polyamic varnishes, the bismaleimide compound was then dissolved in the amounts shown in Table 1 to obtain resin composition varnishes. Thereafter, the procedure of Examples 9–12 was followed to obtain the results summarized in Table 1.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

TABLE 1

| | Resin Composition (Parts by weight) | | | Softening point of uncured film [TMA method] (°C.) | Tensile shear strength (kg/cm²) | |
|---|---|---|---|---|---|---|
| | Polymer (100 parts) | | | | | |
| | Diamine Compound (mole) | Tetracarboxylic dianhydride (mole) | Bismaleimide compound (parts) | | 25° C. | 240° C. |
| Ex. 1 | 4,4'-Bis(3-aminophenoxy)-biphenyl (0.2) | Pyromellitic dianhydride 0.2) | N,N'-Diphenylmethane bismaleimide (10) | 223 | 225 | 145 |
| Ex. 2 | 4,4'-Bis(3-aminophenoxy)-biphenyl (0.2) | Pyromellitic dianhydride (0.2) | N,N'-Diphenylmethane bismaleimide (30) | 187 | 252 | 162 |
| Ex. 3 | 4,4'-Bis(3-aminophenoxy)-biphenyl (0.2) | Pyromellitic dianhydride (0.2) | N,N'-Diphenylmethane bismaleimide (50) | 169 | 298 | 185 |
| Ex. 4 | 4,4'-Bis(3-aminophenoxy)-biphenyl (0.2) | Pyromellitic dianhydride (0.2) | N,N'-Diphenylmethane bismaleimide (80) | 151 | 285 | 180 |
| Ex. 5 | 2,2-Bis[4-(3-aminophenoxy)-phenyl]propane (0.1) | 3,3',4,4'-Benzophenone-tetracarboxylic dianhydride (0.1) | N,N'-Diphenylmethane bixmaleimide (50) | 176 | 290 | 175 |
| Ex. 6 | Bis[4-(3-aminophenoxy)-phenyl]sulfide (0.1) | Pyromellitic dianhydride (0.1) | N,N'-4,4'-Diphenyl-methane bismaleimide (50) | 171 | 285 | 170 |
| Ex. 7 | Bis[4-(3-aminophenoxy)-phenyl]sulfide (0.1) | 3,3',4,4'-Benzophenone-tetracarboxylic dianhydride (0.09) | N,N'-4,4'Diphenyl-methane bismaleimide (50) | 169 | 287 | 170 |
| Ex. 8 | 1,3-Bis(3-aminophenoxy)-benzene (0.1) | 3,3',4,4'-Benzophenone-tetracarboxylic dianhydride (50) | N,N'-4,4'Diphenyl-methane bismaleimide | 174 | 290 | 175 |
| Comp. Ex. 1 | 4,4'Bis(3-aminophenoxy)-biphenyl (0.20) | Pyromellitic dianhydride (0.198) | —(0) | 251 | 250° C. Did not melt so that bonding was not feasible. | |
| Comp. Ex. 2 | 4,4'Bis(3-aminophenoxy)-biphenyl (0.20) | Pyromellitic dianhydride (0.198) | 4,4'-Bis(3-maleimido-phenoxy)biphenyl (120) | No film - forming ability | | |
| Ex. 9 | 4,4'Bis(3-aminophenoxy)- | Pyromellitic dianhydride | 4,4'-Bis(3-maleimide- | 213 | 250 | 170 |

TABLE 1-continued

| | Resin Composition (Parts by weight) | | | Softening point of uncured film [TMA method] (°C.) | Tensile shear strength (kg/cm²) | |
|---|---|---|---|---|---|---|
| | Polymer (100 parts) | | Bismaleimide compound (parts) | | 25° C. | 240° C. |
| | Diamine Compound (mole) | Tetracarboxylic dianhydride (mole) | | | | |
| | biphenyl (0.2) | (0.198) | phenoxy)biphenyl (10) | | | |
| Ex. 10 | 4,4'Bis(3-aminophenoxy)-biphenyl (0.2) | Pyromellitic dianhydride (0.198) | 4,4'-Bis(3-maleimide-phenoxy)biphenyl (30) | 171 | 275 | 185 |
| Ex. 11 | 4,4'Bis(3-aminophenoxy)-biphenyl (0.2) | Pyromellitic dianhydride (0.198) | 4,4'-Bis(3-maleimide-phenoxy)biphenyl (50) | 154 | 310 | 210 |
| Ex. 12 | 4,4'Bis(3-aminophenoxy)-biphenyl (0.2) | Pyromellitic dianhydride (0.198) | 4,4'-Bis(3-maleimide-phenoxy)biphenyl (80) | 144 | 300 | 190 |
| Ex. 13 | 2,2-Bis[4-(3-aminophenoxy)-phenyl]propane (0.1) | 3,3',4,4'-Benzophenone-tetracarboxylic dianhydride (0.095) | 2,2-Bis[4-(3-maleimido-phenoxy)phenyl]propane (50) | 172 | 305 | 205 |
| Ex. 14 | 2,2-Bis[4-(3-aminophenoxy)-phenyl]propane (0.1) | 3,3',4,4'-Benzophenone-tetracarboxylic dianhydride (0.095) | 4,4'-Bis(3-maleimido-phenoxy)biphenyl (50) | 183 | 300 | 190 |
| Ex. 15 | Bis[4-(3-aminophenoxy)-phenyl]sulfide (0.1) | Pyromellitic dianhydride (0.092) | Bis[4-(3-maleimido-phenoxy)phenyl]sulfide (50) | 181 | 290 | 205 |
| Ex. 16 | Bis[4-(3-aminophenoxy)-phenyl]sulfide (0.1) | 3,3',4,4'-Benzophenone-tetracarboxylic dianhydride (0.09) | 1,3-Bis(3-maleimido-phenoxy)benzene (50) | 179 | 290 | 200 |
| Ex. 17 | 1,3-Bis(3-aminophenoxy)-benzene (0.1) | 3,3',4,4'-Benzophenone-tetracarboxylic dianhydride (0.098) | 1,3-Bis(3-maleimido-phenoxy)benzene (50) | 167 | 295 | 190 |

We claim:

1. A thermosetting resin composition comprising:
(i) about 100 parts by weight of a polymer having recurring units represented by the formula (I):

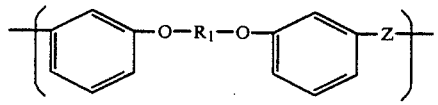

wherein $R_1$ represents a divalent group selected from the group consisting of

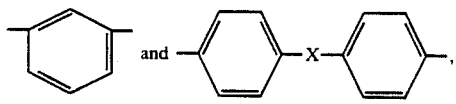

X is
selected from the group consisting of a direct bond, divalent hydrocarbon groups containing from about 1 to about 10 carbon atoms, hexafluorinated isopropylidene groups, carbonyl groups, thio groups, sulfinyl groups, sulfonyl groups and oxo groups, and Z represents at least one compound selected from the group consisting of

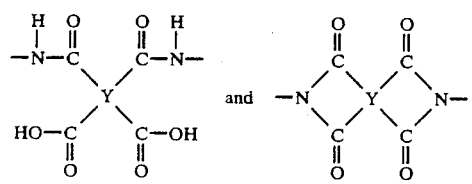

wherein Y represents a tetravalent group selected from the group consisting of aliphatic groups having at least two carbon atoms, cycloaliphatic groups, monocyclic aromatic groups, fused polycyclic aromatic groups, and non-fused cyclic aromatic groups composed of aromatic groups bonded together directly or via a cross-link; and (ii) from about 5 to about 100 parts by weight of a bismaleimide compound selected from the group consisting of compounds of the formula (II):

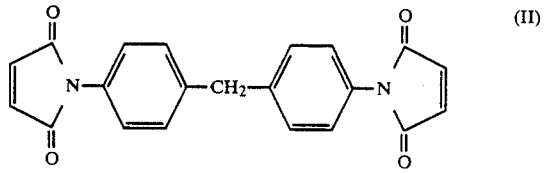

and compounds of the formula (III):

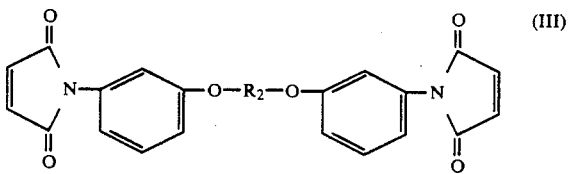

wherein $R_2$ represents a divalent group selected from the group consisting of

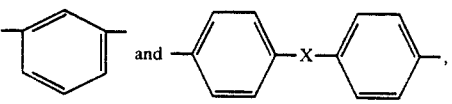

X is
selected from the group consisting of a direct bond, divalent hydrocarbon groups having from about 1 to about 10 carbon atoms, hexafluorinated isopropylidene groups, carbonyl groups, thio groups, sulfinyl groups, sulfonyl groups and oxo groups.

2. The thermosetting resin composition of claim 1, wherein said polymer is a polyamic acid prepared by reacting (a) a diamine compound of the formula (IV):

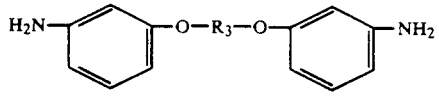

wherein R₃ represents a divalent group selected from the group consisting of

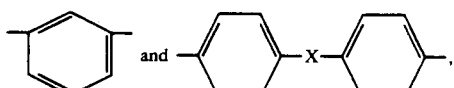

X is selected from the group consisting of a direct bond, divalent hydrocarbon groups having from about 1 to about 10 carbon atoms, hexafluorinated isopropylidene groups, carbonyl groups, thio groups, sulfinyl groups, sulfonyl groups and oxo groups, with (b) a compound selected from the group consisting of at least one tetracarboxylic dianhydride and a polyimide.

3. The resin composition of claim 2 wherein in said diamine compound of the formula (IV), R₃ is selected from the group consisting of

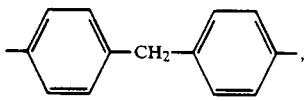

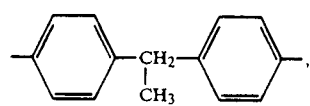

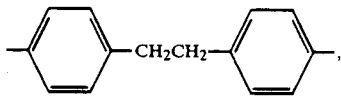

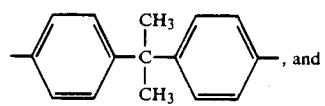

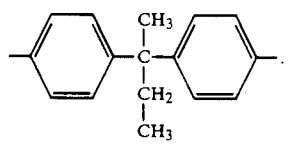

4. The resin composition of claim 2, wherein said tetracarboxylic dianhydride has the formula (V):

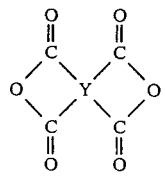

wherein Y is a tetravalent group selected from the group consisting of aliphatic groups having at least two carbon atoms, cycloaliphatic groups, monocyclic aromatic groups, fused polycyclic aromatic groups, and non-fused cyclic aromatic groups.

5. The resin composition of claim 4 wherein Y is a tetravalent group selected from the group consisting of aliphatic hydrocarbons having from 1 to 4 carbon atoms, cycloaliphatic hydrocarbons having from 4 to 8 carbon atoms,

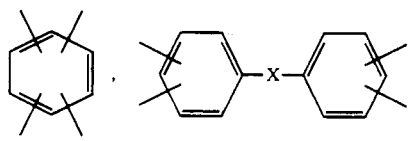

wherein X is selected from the group consisting of a direct bond, aliphatic hydrocarbons having from 1 to 4 carbon atoms, aliphatic hydrocarbons having from 1 to 4 carbon atoms substituted by from 1 to 6 fluorine atoms, —O—, —CO—,

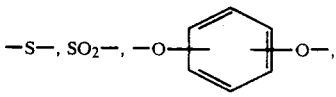

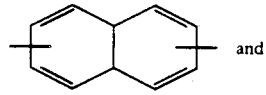

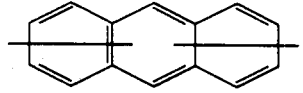

6. The resin composition of claim 2 wherein said diamine compound is selected from the group consisting of 4,4'-bis(3-aminophenoxy)biphenyl, 2,2-bis[4-(3-aminophenoxy)phenyl]propane, bis[4-(3aminophenoxy)phenyl]sulfite and 1,3-bis(3-aminophenoxy)benzene.

7. The resin composition of claim 2 wherein said tetracarboxylic dianhydride selected from the group consisting of pyromellitic dianhydride and 3,3',4,4'-benzophenonetetracarboxylic dianhydride.

8. The resin composition of claim 1 wherein said bismaleimide compound is selected from the group consisting of N,N'-4,4'-diphenylmethanebismaleimide, 4,4'-bis(3-maleimidophenoxy)biphenyl, 2,2-bis[4-(3maleimidophenoxy)phenyl]propane, bis[4-(3-maleimidophenoxy)phenyl]sulfide and 1,3-bis(3-maleimidophenoxy)benzene.

9. A process for preparing a thermosetting resin composition comprising mixing (i) about 100 parts by weight of a polymer having recurring units represented by the formula (I):

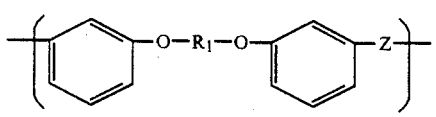

wherein $R_1$ represents a divalent group selected from time group consisting of

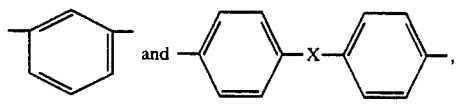

X is selected from the group consisting of a direct bond, divalent hydrocarbon groups having from about 1 to about 10 carbon atoms, hexafluorinated isopropylidene groups, carbonyl groups, thio groups, sulfinyl groups, sulfonyl groups and oxo groups, and Z represents at least one compound selected from the group consisting of

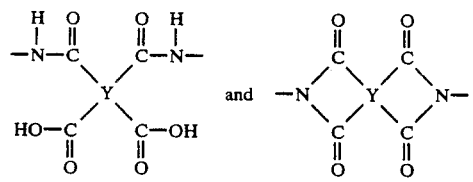

wherein Y represents a tetravalent group selected from the group consisting of aliphatic groups having at least two carbon atoms, cycloaliphatic groups, monocyclic aromatic groups, fused polycyclic aromatic groups, and non-fused cyclic aromatic groups composed of aromatic groups bonded together directly or via a crosslink, and (ii) from about 5 to about 100 parts by weight of a bismaleimide compound selected from the group consisting of compounds of the formula (II):

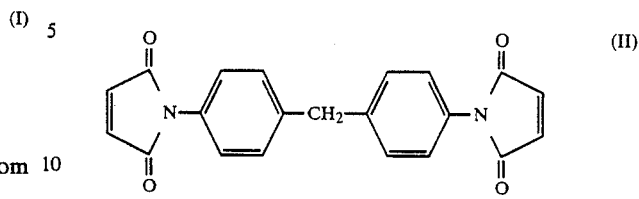

and compounds of the formula (III):

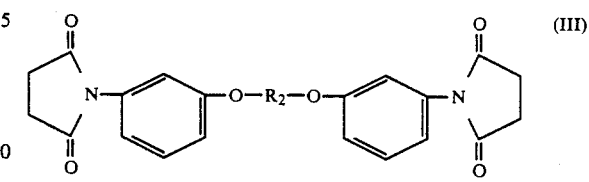

wherein $R_2$ represents a divalent group selected from the group consisting of

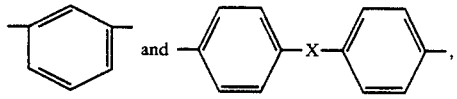

X is selected from the group consisting of a direct bond, divalent hydrocarbon groups having from about 1 to about 10 carbon atoms, hexafluorinated isopropylidene groups, carbonyl groups, thio groups, sulfinyl groups, sulfonyl groups and oxo groups.

10. The process of claim 9 wherein said bismaleimide compound is dissolved in a polymer varnish prior to mixing with said polymer.

11. The process of claim 9 wherein said bismaleimide compound is dissolved in a polymer suspension prior to mixing with said polymer.

* * * * *

UNITED STATES PATENT AND TRADEMARK OFFICE
CERTIFICATE OF CORRECTION

PATENT NO.  :   4,987,207
DATED       :   January 22, 1991
INVENTOR(S) :   Yamaya et al.

It is certified that error appears in the above-identified patent and that said Letters Patent is hereby corrected as shown below:

In claim 9, line 11, delete "time" and insert therefor --the--.

Signed and Sealed this

Eleventh Day of August, 1992

*Attest:*

DOUGLAS B. COMER

*Attesting Officer*    Acting Commissioner of Patents and Trademarks